(12) United States Patent
Fu et al.

(10) Patent No.: US 11,805,571 B2
(45) Date of Patent: Oct. 31, 2023

(54) MESH NETWORK MANAGEMENT

(71) Applicant: Hewlett Packard Enterprise Development LP, Houston, TX (US)

(72) Inventors: Xiaoyang Fu, Beijing (CN); Xuguang Jia, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 40 days.

(21) Appl. No.: 17/244,318

(22) Filed: Apr. 29, 2021

(65) Prior Publication Data
US 2022/0353953 A1    Nov. 3, 2022

(51) Int. Cl.
*H04W 84/18*    (2009.01)
*H04W 12/04*    (2021.01)
*H04W 88/10*    (2009.01)

(52) U.S. Cl.
CPC ............ *H04W 84/18* (2013.01); *H04W 12/04* (2013.01); *H04W 88/10* (2013.01)

(58) Field of Classification Search
CPC ...... H04W 84/18; H04W 12/04; H04W 88/10
See application file for complete search history.

(56) References Cited

U.S. PATENT DOCUMENTS

| | | | |
|---|---|---|---|
| 9,226,144 B2 | 12/2015 | Cherian | |
| 9,661,560 B2 | 5/2017 | Park et al. | |
| 10,225,792 B2 | 3/2019 | Lee et al. | |
| 2014/0136844 A1* | 5/2014 | Ding | H04W 12/0431 713/168 |
| 2015/0282056 A1* | 10/2015 | Cherian | H04W 48/08 370/328 |
| 2015/0282064 A1* | 10/2015 | Patil | H04W 48/20 370/329 |
| 2016/0150536 A1* | 5/2016 | Valliappan | H04W 74/0816 370/329 |
| 2018/0310240 A1* | 10/2018 | Kannan | H04W 48/14 |
| 2019/0268892 A1 | 8/2019 | Gidvani et al. | |
| 2020/0128531 A1 | 4/2020 | Min et al. | |
| 2020/0221378 A1* | 7/2020 | Kneckt | H04W 48/14 |
| 2020/0280905 A1 | 9/2020 | Gan et al. | |
| 2021/0392571 A1* | 12/2021 | Kneckt | H04W 48/10 |
| 2022/0201596 A1* | 6/2022 | Zhou | H04W 48/16 |

* cited by examiner

*Primary Examiner* — Jae Y Lee
(74) *Attorney, Agent, or Firm* — Hewlett Packard Enterprise Patent Department

(57) ABSTRACT

In embodiments of the present disclosure, a method is provided for managing a mesh point. A request is transmitted from a mesh point to a mesh portal, and the request indicates that Reduced Neighbor Report (RNR) information is required. A beacon with the RNR information is received from the mesh portal. A mesh link is established with a target mesh portal based on the beacon with the RNR information. Therefore, the time cost and the data communication of a scanning procedure of the mesh point may be greatly reduced. Further, communications in the scanning procedure are lowered, such that conflicts in the air may be alleviated.

20 Claims, 6 Drawing Sheets

MESH NETWORK MANAGEMENT

BACKGROUND

Nowadays, a Wi-Fi (Wireless Fidelity) mesh network may include one or more mesh portals (such as Wi-Fi access points) that are equipped with multiple radios of 2.4G, 5G and 6G. In order to establish a mesh link with a mesh portal, a mesh point (such as a mobile device) should scan all the channels that are supported by the multiple radios. Here, each radio may include a plurality of channels, and thus the scanning procedure may last for a long time. Further, there may be conflicts in the air, which leads to transmission failures and thus the mesh point should rescan all the channels to obtain basic information for establishing the mesh link. In turns, the time cost of the scanning procedure is further increased. Therefore, it is desired to propose a more efficient solution for improving the scanning procedure in the mesh network.

SUMMARY

According to a first aspect of the present disclosure, there is provided a method for managing a mesh point in a mesh network. A request is transmitted from a mesh point to a mesh portal, and the request indicates that Reduced Neighbor Report (RNR) information is required. A beacon with the RNR information is received from the mesh portal. A mesh link is established with a target mesh portal based on the beacon with the RNR information.

According to a second aspect of the present disclosure, there is provided a method for managing a mesh portal. A request is received from a mesh point at a mesh portal, and the request indicates that Reduced Neighbor Report (RNR) information is required. A beacon with the RNR information is transmitted to the mesh point, and the beacon includes a state of the mesh portal and the RNR information including a state of at least one neighbor mesh portal of the mesh portal.

According to a third aspect of the present disclosure, there is provided a mesh portal, here the mesh portal comprises a processor and a memory coupled to the processor. The memory storing instructions to cause the processor to: receive, from a mesh point, a request indicating that Reduced Neighbor Report (RNR) information is required, the mesh portal and at least one neighbor mesh portal of the mesh portal include a plurality of radios associated with a plurality of mobile network generations, respectively; collect radio states of the plurality of radios included in the mesh portal and the at least one neighbor mesh portal; and transmit, to the mesh point, a beacon with the RNR information, the beacon including radio states of the plurality of radios included in the mesh portal, and the RNR information including radio states of the plurality of radios included in the at least one neighbor mesh portal.

The above aspects of the present disclosure may combine states of the mesh portal and the at least one neighbor mesh portal of the mesh portal into the beacon. Therefore, the time cost and data communications of the scanning procedure may be greatly reduced. Further, communications in the scanning procedure are lowered, such that conflicts in the air may be alleviated.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
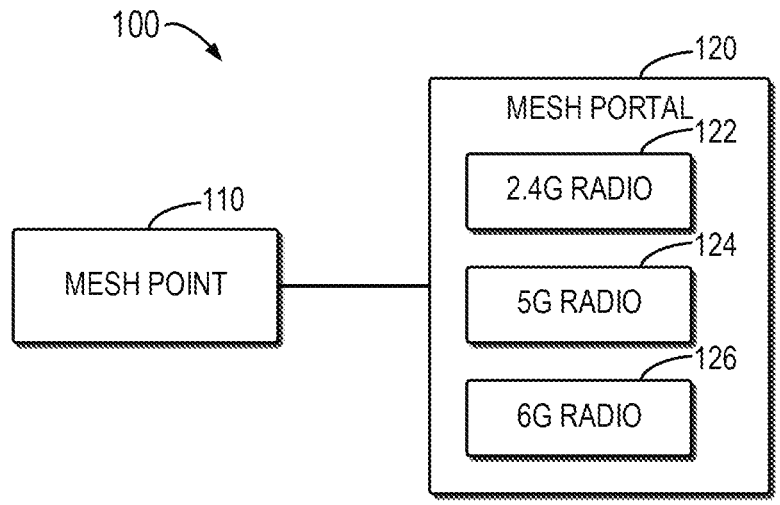
FIG. 1 illustrates a block diagram of a mesh network including a mesh point and a mesh portal in which embodiments of the present disclosure may be implemented.

In the mesh network, there may be multiple mesh portals and each of the mesh portals may has one or more radios. Reference will be made to FIG. 1 for a brief description of the mesh network. FIG. 1 illustrates a block diagram of a mesh network 100 including a mesh point and a mesh portal in which embodiments of the present disclosure may be implemented. Here, the mesh network 100 may include: a mesh point 110 such as a smart phone or another terminal device, and a mesh portal 120 such as a Wi-Fi access point. The mesh portal 120 may include the 2.4G radio 122, the 5G radio 124, and the 6G radio 126, and each of these radios may include multiple channels. In order to connect to the mesh portal 120, the mesh point 110 may scan various channels included in the multiple radios 122, 124, and 126.

Although FIG. 1 illustrates only one mesh portal 120, the mesh network 100 may include more mesh portals. For example, there may be one or more neighbor mesh portals near the mesh portal 120, and thus the mesh point 110 may scan the mesh portal 120 and each of neighbor mesh portals before establishing a mesh link. During the scanning procedure, the mesh point 110 has to scan each channel of the multiple radios in the mesh portal. On one hand, the scanning procedure will last for a long time. One the other hand, conflicts often occur in the mesh network such that the mesh point 110 has to rescan these channels, which leads to a low efficiency in the scanning procedure.

In view of the above drawbacks, embodiments of the present disclosure provide a more effective way for managing a mesh network. In embodiments of the present disclosure, a Reduced Neighbor Report (RNR) flag is defined in the mesh network, here the RNR flag may be added into a request that is transmitted from the mesh point 110 to the mesh portal 120 during the scanning procedure. Here, the RNR flag may indicate that RNR information is required from the mesh portal 120. In other words, the RNR flag requires that a beacon from the mesh portal 120 to include more information than before. For example, the beacon may include information related to the multiple radios in the mesh portal 120, as well as information related to at least one neighbor mesh portal of the mesh portal 120. With these embodiments, the mesh point 110 may obtain more information of the multiple radios in the mesh portal 120 and the at least one neighbor mesh portal from a single beacon transmitted by the mesh portal 120. Therefore, the mesh point 110 is not required to scan all the mesh portals in the mesh network 100 on each channel of the 2.4G radio, the 5G radio, and the 6G radio, respectively. On one hand, the scanning time duration is significantly reduced. On the other hand, communications related to the scanning procedure are lowered, such that conflicts in the air may be alleviated.

Figure 2:
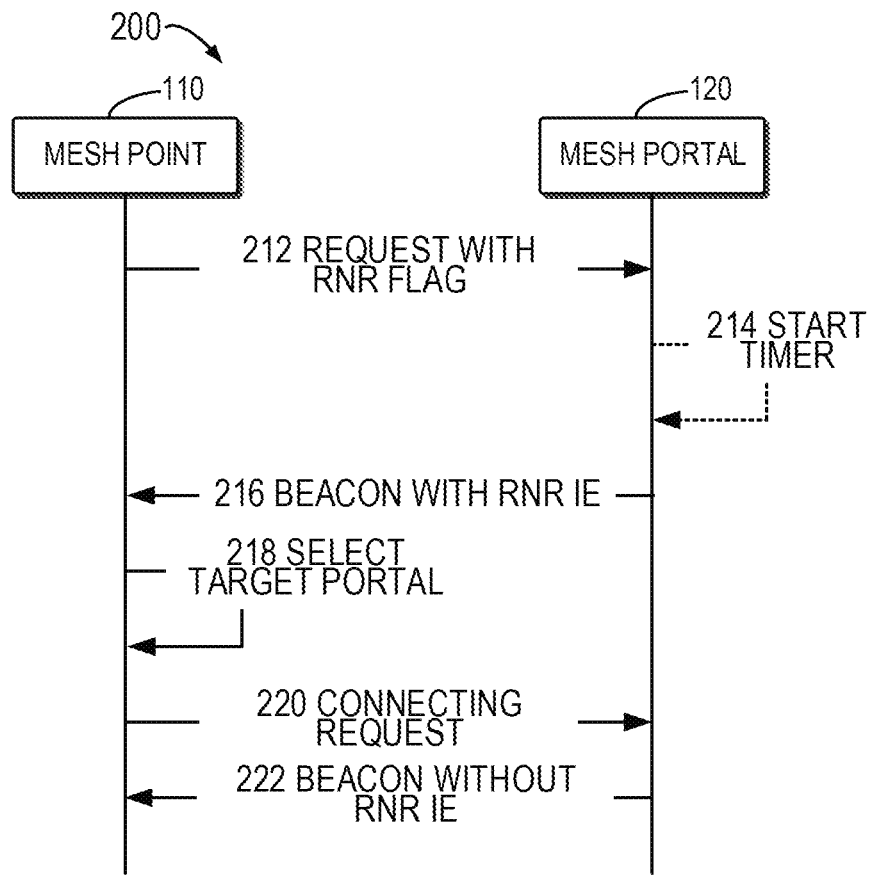
FIG. 2 illustrates a block diagram of an example procedure for communications during a scanning procedure according to embodiments of the present disclosure.

Reference will be made to FIG. 2 for a general description of the present disclosure, here FIG. 2 illustrates a block diagram of an example procedure 200 for communications during a scanning procedure according to embodiments of the present disclosure. In FIG. 2, the mesh point 110 may transmit 212 a request to the mesh portal 120, here the request may include the above RNR flag for indicating that the RNR information is required. In some embodiments of the present disclosure, once the mesh portal 120 receives the request, the mesh portal 120 may start 214 a timer for representing an end time for transmitting at least one further beacon with the RNR information. In one example, the timer may be set to 10 minutes or another value, which indicates that any beacon that is sent from the mesh portal 120 to the mesh point 110 within the next 10 minutes should additionally include the RNR information. Once the timer is expired, the mesh portal 120 may turn back to normal and may send normal beacons without the RNR information. With these embodiments, the timer may define a time duration for the scanning procedure, such that the mesh point 110 is free from scanning each and every channel in the multiple channels of the mesh portal 120 and the neighbor mesh portal(s). It is to be understood that the step for starting the timer is an optional step, in other embodiments of the present disclosure, the mesh portal 120 may stop sending the RNR information when a request without the RNR flag is received from the mesh point 110.

Figure 3:
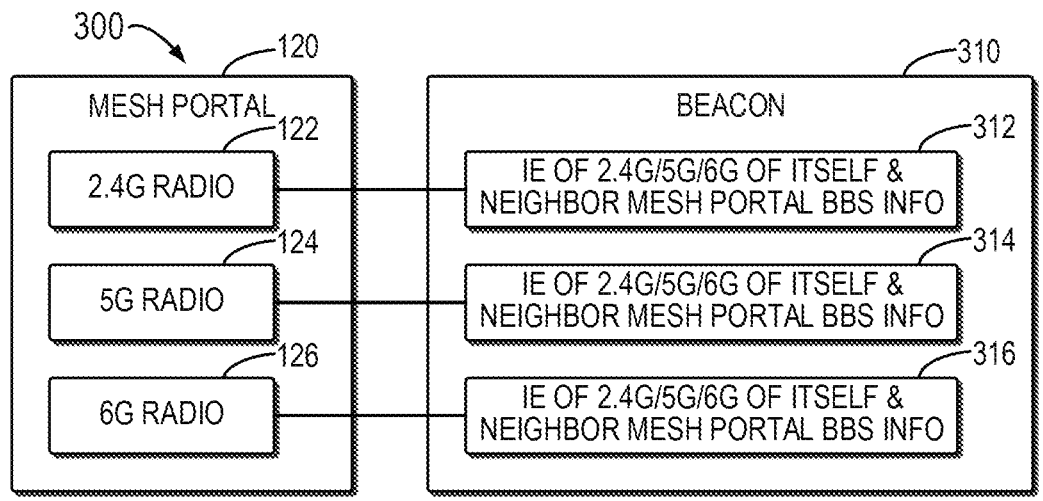
FIG. 3 illustrates a block diagram of an example data structure of a beacon that is transmitted from a mesh portal to a mesh point according to embodiments of the present disclosure.

Further, the mesh portal 120 may transmit a beacon with the RNR Information Element (IE) to reply the RNR flag. Reference will be made to FIG. 3 for more details about the beacon, where FIG. 3 illustrates a block diagram of an example data structure 300 of a beacon that is transmitted from a mesh portal to a mesh point according to embodiments of the present disclosure. In FIG. 3, a beacon 310 is provided for carrying the RNR information IE, where the beacon 310 may include an IE 312, an IE 314, and an IE 316. Here, the IE 312 includes information of the 2.4G, 5G and 6G radios of the mesh portal 120 itself. Further, the IE includes the neighbor mesh portal Basic Service Set (BSS). The IE 314 includes information of the 2.4G, 5G and 6G radios of the mesh portal 120 itself and the neighbor mesh portal BSS, and the IE 316 includes information of the 2.4G, 5G and 6G radios of the mesh portal 120 itself and the neighbor mesh portal BSS.

With these embodiments, both of the time duration and the data amount related to the scanning procedure may be greatly reduced. For example, the 6G radio includes 7 channels, which is much less than the number of channels for the 2.4G and 5G radios. If 160M channel scanning is implemented in 6G and the time duration for scanning one channel costs 100 ms, the total scanning procedure will cost 700 ms (100 ms*7). In other words, the 6G band may lead the 2.4G and 5G bands to find a target mesh portal, and it only takes 700 ms to finish the scanning procedure. Further, as the beacon 310 further includes RNR information, all BSS related to the multiple radios in the at least one neighbor mesh portal may be provided to the mesh portal 120 by the beacon 310. Therefore, the mesh point 110 does not need to scan the neighbor mesh portal by an individual scanning procedure.

Referring back to FIG. 2, once the mesh point 110 receives the beacon 310, the information related to the multiple radios in the multiple mesh portals (including the mesh portal 120 and the at least one neighbor mesh portal) may be extracted from the beacon 310, and then the mesh point 110 may select 218 a target mesh portal based on the extracted information. For example, the mesh point 110 may select a target mesh portal with the best health state base on the extracted information for establishing a mesh link. Here, the target mesh portal may be any of the mesh portal 120 and the at least one mesh portal, and then a mesh link may be established between the target mesh portal and the mesh point 110.

In some embodiments of the present disclosure, the mesh point 110 may select any of the 2.4G radio, the 5G radio and 6G radio, and then the mesh point 110 may transmit 220 a connecting request for establishing the mesh link with the target mesh portal via the selected radio. Further, the mesh portal 120 may transmit 222 a beacon without RNR IE as a probe response for confirming that a mesh link is established between the mesh point and the radio of the mesh portal. As the mesh point 110 has selected a target mesh portal and established the mesh link with the target mesh portal, the scanning procedure is successful and thus the mesh portal 120 does not need to carry the RNR information in the beacons. Here, the connecting request provides another way to stop the beacon with the RNR IE. With these embodiments, as the scanning procedure is greatly decreased, the total time cost for establishing the mesh link is also reduced.

Figure 4:
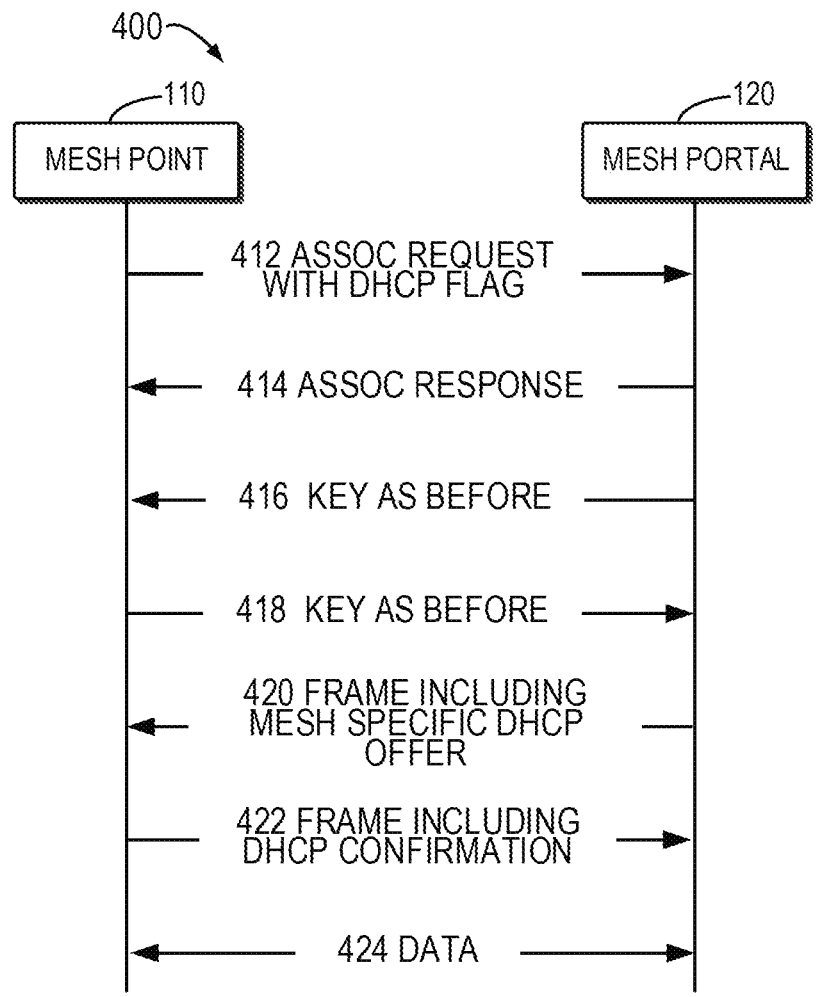
FIG. 4 illustrates a block diagram of an example procedure for obtaining a DHCP offer according to embodiments of the present disclosure.

In order to establish the mesh link, the mesh point 110 should be authenticated and allocated with a network address. In some embodiments of the present disclosure, a Dynamic Host Configuration Protocol (DHCP) flag is defined for indicating that DHCP information may be inserted in an Extensible Authentication Protocol over LAN (EAPoL) frame that is sent between the mesh point 110 and the mesh portal 120. Reference will be made to FIG. 4 for more details, here FIG. 4 illustrates a block diagram of an example procedure 400 for obtaining a DHCP offer according to embodiments of the present disclosure. In FIG. 4, the mesh point 110 may transmit 412 an association request with a DHCP flag, and the DHCP flag may require the EAPoL frame to include DHCP information. In other words, the DHCP flag triggers the mesh portal 120 to insert DHCP information into the normal EAPoL frames.

The mesh portal 120 may transmit 414 an association response to the mesh point 110 for indicating that the mesh portal 120 will insert the DHCP information. Further, the mesh portal 120 and the mesh point 110 may exchange their keys (such as passwords) for establishing the mesh link. Specifically, the mesh portal 120 may transmit 416 its key as before, and the mesh point 110 may transmit 418 its key as before. In other words, the key is transmitted in the same way as what is implemented according to EAPoL. The mesh point 110 and the mesh portal 120 may compare the received key with its own key, so as to determine whether the keys at the mesh point 110 and mesh portal 120 match.

Figure 5:
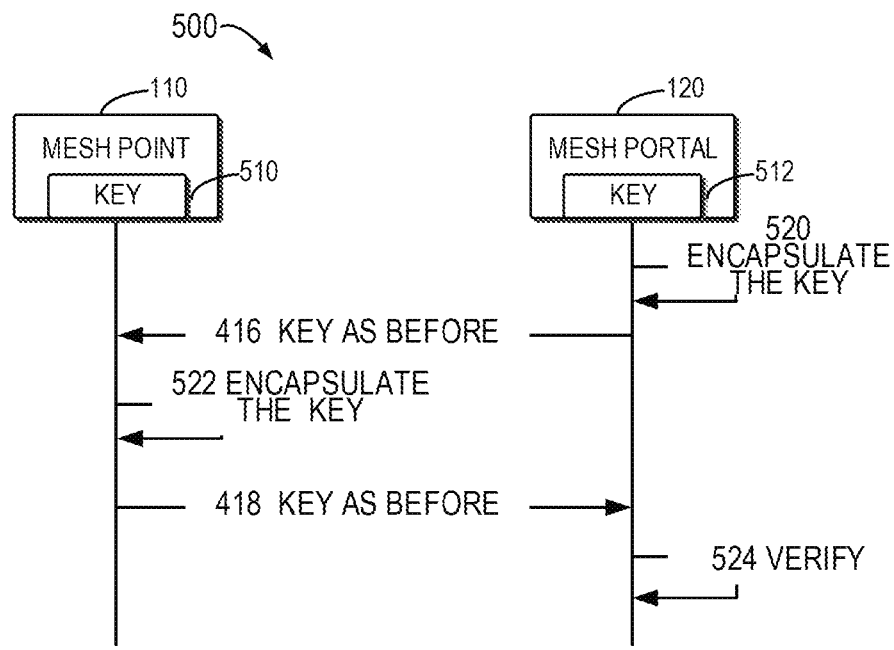
FIG. 5 illustrates a block diagram of an example procedure for verifying keys for a mesh point and a mesh portal according to embodiments of the present disclosure.

Reference will be made to FIG. 5 for more details about exchanging the key, where FIG. 5 illustrates a block diagram of an example procedure 500 for verifying keys for a mesh point and a mesh portal according to embodiments of the present disclosure. In FIG. 5, a key 510 is provided to the mesh point 110 and a key 512 is provided to the mesh portal 120 in advance, respectively. For the sake of security, the mesh portal 120 may encapsulate 520 the key 512 and then transmit 416 it to the mesh point 110 as what is implemented according to EAPoL. Further, the mesh point 110 may encapsulate 522 the key 510 and transmit 418 it to the mesh portal 120 as before. Next, the mesh portal 120 may verify the mesh point 110 if the received key matches the key 512. Here, the verifying procedure is the same as before and then the mesh point 110 and the mesh portal 120 may use the verified keys 510 and 512 for encrypting further frames. In other words, a pairwise transient key (including the key 510 at the mesh point 110 and the key 512 at the mesh portal 120) is shared between the mesh point 110 and the mesh portal 120.

Referring back to FIG. 4, the mesh portal 120 may transmit 420 an EAPoL frame including a mesh specific DHCP offer. In some embodiments of the present disclosure, the mesh portal 120 may encrypt the EAPoL frame with the key shared by the mesh point 110 and the mesh portal 120. Therefore, the security level of the mesh network 100 may be increased. It is to be understood that the DHCP offer may be received by the target mesh portal from any of: a DHCP server that is deployed at the mesh portal; and a DHCP server that is deployed in a further network other than a mesh network that includes the mesh point and the mesh portal. FIG. 4 shows the situation where the DHCP server is deployed in the mesh portal 120, and thus the DHCP server may directly provide one DHCP offer (for example, one network address) to the mesh portal 120. Once the mesh point 110 receives the DHCP offer, the mesh point 110 may transmit 422 a further EAPoL frame with a DHCP confirmation for accepting the DHCP offer. In some embodiments of the present disclosure, the mesh point 110 may encrypt the further EAPoL frame with the key 510 so as to increase the security level of the mesh network 100. Afterwards, data may be communicated 424 between the mesh point 110 and the mesh portal 120.

Figure 6:
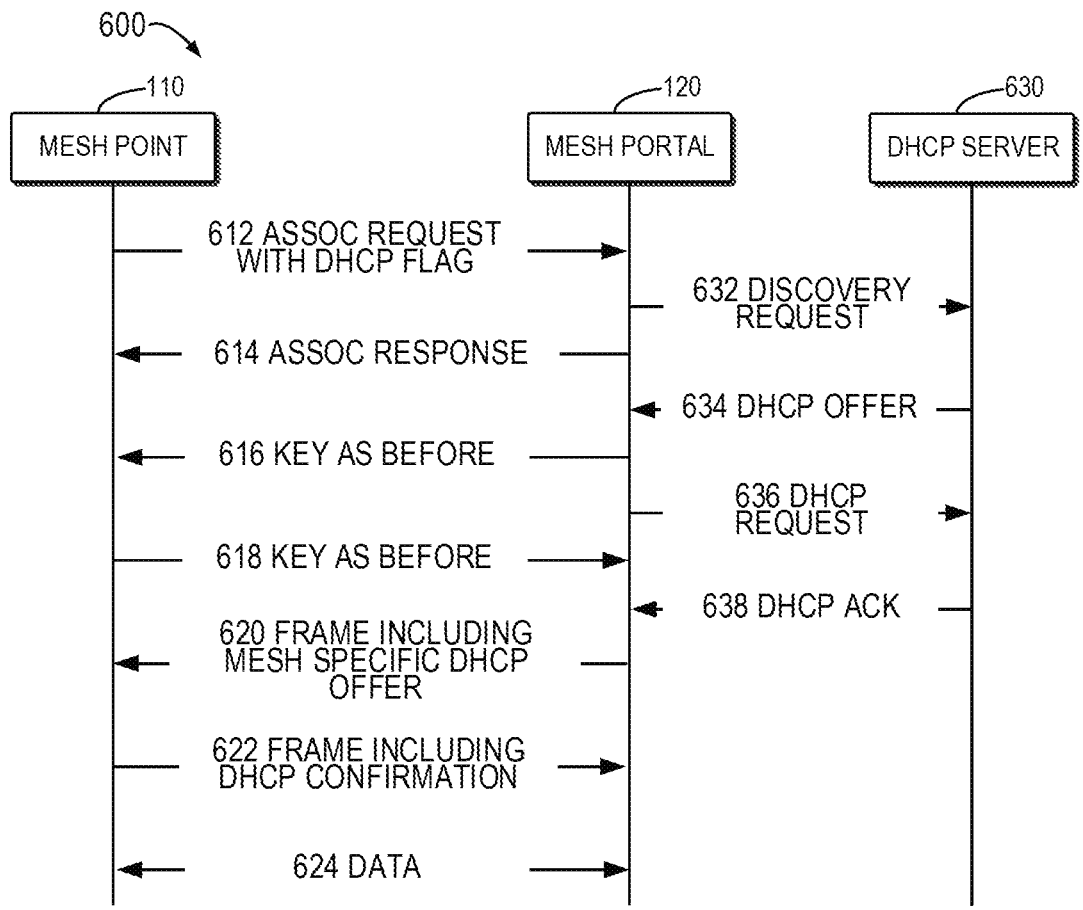
FIG. 6 illustrates a block diagram of another example procedure for obtaining a DHCP offer according to embodiments of the present disclosure.

Referring to FIG. 6, this figure illustrates a block diagram of another example procedure 600 for obtaining a DHCP offer according to embodiments of the present disclosure. FIG. 6 shows another situation where the DHCP server is not deployed in the mesh portal 120. For example, the DHCP server 630 may be deployed outside the mesh network 100. In FIG. 6, steps 612, 614, 616, 618, 620, 622 and 624 are the same as steps 412, 414, 416, 418, 420, 422 and 424 illustrated in FIG. 4, and the difference between FIGS. 4 and 6 relates to steps 632 to 638 for obtaining the DHCP offer from the DHCP server 630. In FIG. 6, the mesh portal 120 may transmit 632 a discovery request to the DHCP server 630, and then the DHCP server 630 may transmit 634 one or more DHCP offers to the mesh portal 120. The mesh portal 120 may select one from the one or more DHCP offers and transmits 636 a DHCP request for an allocation of the selected DHCP offer. Then, the DHCP may transmit 638 a DHCP acknowledge to the mesh portal 120. In some embodiments of the present disclosure, the mesh portal 120 may insert the DHCP offer into an EAPoL frame and encrypt the EAPoL frame with the key 512.

With these embodiments shown in FIGS. 4 and 6, the DHCP information is encoded in the EAPoL frame, and thus the address allocating procedure is combined with the key verifying procedure. Therefore, the time cost and the data communications between the mesh point 110 and the mesh portal 120 for establishing the mesh link may be further decreased, and thus the mesh link may be established in an effective and easy way.

As the beacon 310 includes IE related to 2.4G, 5G, and 6G radios of the mesh portal 120 and the at least one neighbor mesh portal, the data amount of the beacon 310 may be increased significantly. However, some portions in the beacon 310 are not important for establishing the mesh link. In some embodiments of the present disclosure, the beacon 310 may be compressed by replacing at least one field in the beacon 310 with a bitmap. Specifically, the mesh portal 120 may identify the at least one field that is unimportant for establishing the mesh link.

Figure 7:
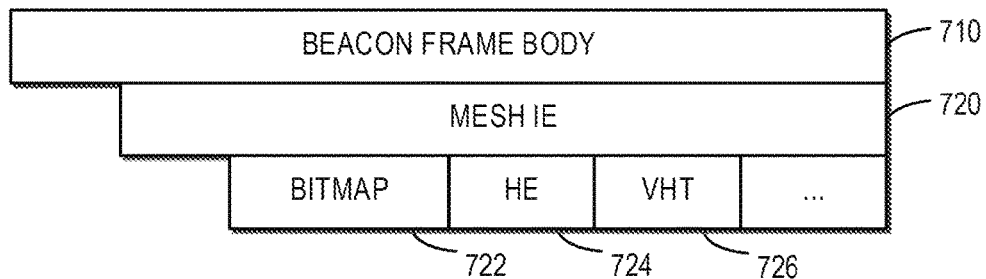
FIG. 7 illustrates a block diagram of an example data structure of a compressed beacon that is transmitted from a mesh portal to a mesh point according to embodiments of the present disclosure.

FIG. 7 illustrates a block diagram of an example data structure of a compressed beacon 700 that is transmitted from a mesh portal to a mesh point according to embodiments of the present disclosure. Here, the beacon 700 includes a beacon frame body 710, and a mesh IE 720 is included in the beacon frame body 710. As the mesh link does not require detailed information of the fields such as "high-throughput" and "very-high throughput," and so on, these fields may be replaced with a bitmap including multiple bits. Each bit in the bitmap may represent a brief state of the removed fields. For example, bitmap 722 in FIG. 7 may represent a start of the bitmap, a bit of HE 724 may indicate that the mesh portal 120 relates to high-throughput (for example, the bit of HE 724 is set to "I"), and a bit of VHT 726 may indicate that the mesh portal 120 relates to very-high-throughput (for example, the bit of VHT 726 is set to "I").

Figure 8:
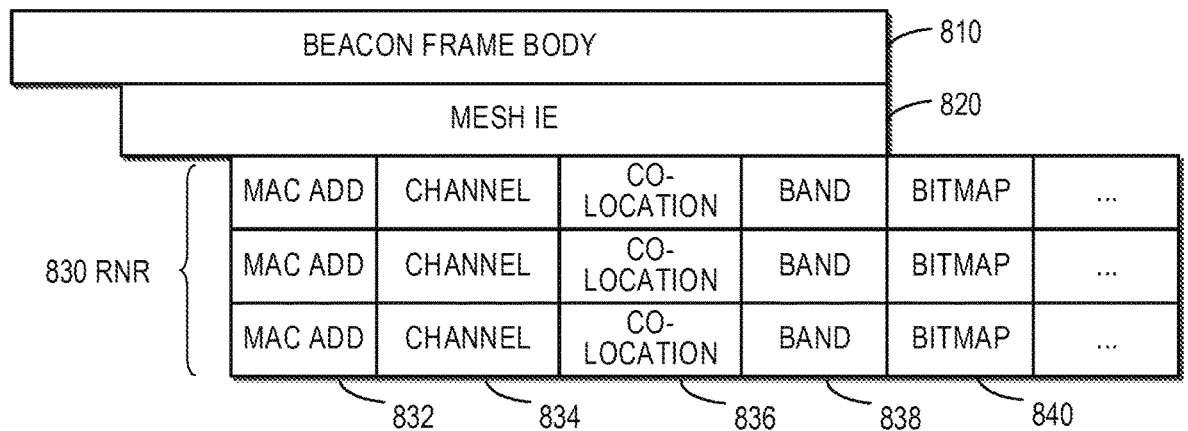
FIG. 8 illustrates a block diagram of another example data structure of a compressed beacon that is transmitted from a mesh portal to a mesh point according to embodiments of the present disclosure.

FIG. 8 illustrates a block diagram of another example data structure of a compressed beacon 800 that is transmitted from a mesh portal to a mesh point according to embodiments of the present disclosure. In FIG. 8, the beacon 800 includes a beacon frame body 810, and a mesh IE 820 is included in the beacon frame body 810. Further, the beacon 800 includes an RNR portion 830 that carries information related to multiple neighbor mesh portals. Here, the RNR portion 830 includes information for three neighbor mesh portals, and each line corresponds to one neighbor mesh portal. Taking the last line as an example, a field 832 may represent a MAC address of the neighbor mesh portal, a field 834 may represent channel information of the neighbor mesh portal, a field 834 may represent co-location of the neighbor mesh portal, a field 838 may represent a band of the neighbor mesh portal, and a field 840 may represent a bitmap of the unimportant information.

With these embodiments, the beacon does not need to include the unimportant information. Instead, the unimportant may be replaced by a bitmap and thus the data amount of the beacon may be decreased greatly. Further, a lower bandwidth is required between the mesh point 110 and the mesh portal 120, and the time cost for transmitting the beacon is also reduced, which resulting a more effective establishing procedure.

Figure 9:
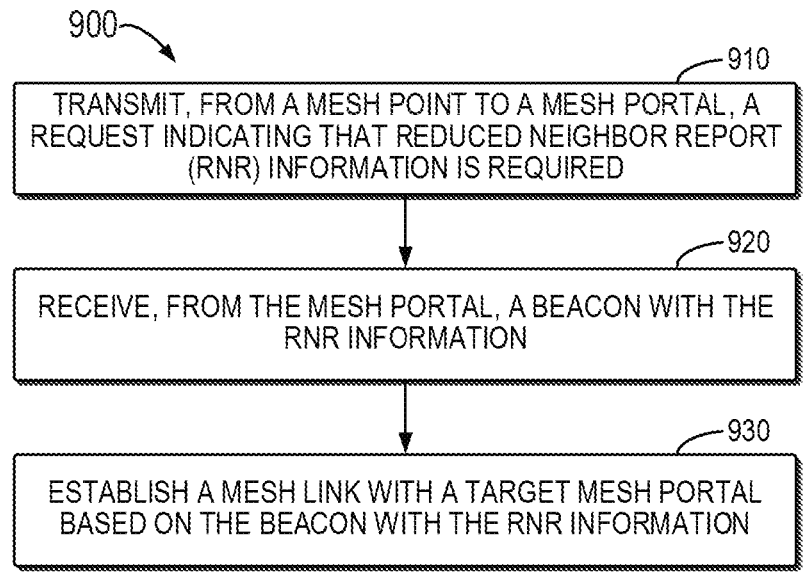
FIG. 9 illustrates a flowchart of an example method for managing a mesh point according to embodiments of the present disclosure.

Having described communications between the mesh point 110 and the mesh portal 120, hereinafter, reference will be made to FIG. 9 for steps implemented at the mesh point 110. FIG. 9 illustrates a flowchart of an example method 900 for managing a mesh point according to embodiments of the present disclosure. In some embodiments of the present disclosure, the mesh portal 120 and the at least one neighbor mesh portal include a plurality of radios associated with a plurality of mobile network generations. At a block 910, a request is transmitted from a mesh point to a mesh portal, here the request indicates that Reduced Neighbor Report (RNR) information is required. At a block 920, a beacon with the RNR information is received from the mesh portal. In some embodiments of the present disclosure, at least one field in the beacon is replaced with a bitmap, the at least one field including information that is unimportant for establishing the mesh link.

At a block 930, a mesh link is established with a target mesh portal based on the beacon with the RNR information. In some embodiments of the present disclosure, the target mesh portal is selected based on a state of the mesh portal that is included in the beacon and a state of at least one neighbor mesh portal of the mesh portal that is included in the RNR information, and the mesh link is established with the target mesh portal. In some embodiments of the present disclosure, the states of the mesh point and the at least one neighbor mesh portal include radio states of the plurality of radios. In some embodiments of the present disclosure, a radio is selected from the plurality of radios included in the target mesh portal based on the radio states, and then the mesh link is established with the target mesh portal via the selected radio.

In some embodiments of the present disclosure, a probe request is transmitted to the target mesh portal, and the probe request indicates that the RNR information is not required in a further beacon from the mesh portal. In some embodiments of the present disclosure, a request is transmitted to the target mesh portal, and the request indicates that Dynamic Host Configuration Protocol (DHCP) information is required in an Extensible Authentication Protocol over LAN (EAPoL) frame. An EAPoL frame with a DHCP offer is received from the target mesh portal, and then a further EAPoL frame with a DHCP confirmation is transmitted to the target mesh portal. In some embodiments of the present disclosure, the EAPoL frame is encrypted with a pairwise transient key shared by the mesh point and the mesh portal. The further EAPoL frame is encrypted with the pairwise transient key, and then the encrypted further EAPoL frame is transmitted. In some embodiments of the present disclosure, the DHCP offer is received by the target mesh portal from any of: a DHCP server that is deployed at the target mesh portal; and a DHCP server that is deployed in a further network other than a mesh network that includes the mesh point and the mesh portal.

With these embodiments, the method 900 provides an effective solution for managing the mesh point 110. Specifically, the 6G band may lead the mesh point 110 to obtain information of all the multiple radios (including 2.4G, 5G and 6G) in the mesh portal 120 and the at least one neighbor mesh portal. Therefore, the time cost and the data communication of the scanning procedure may be greatly reduced. Further, communications in the scanning procedure are lowered, such that conflicts in the air may be alleviated.

Figure 10:
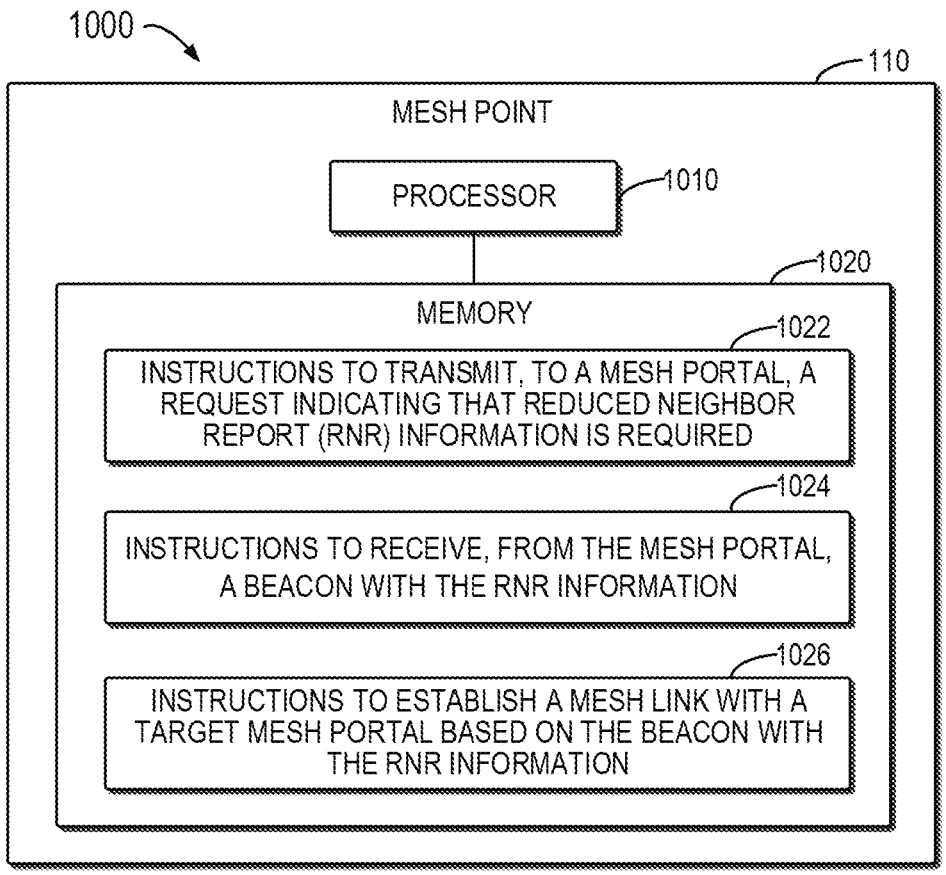
FIG. 10 illustrates a block diagram of a mesh point according to embodiments of the present disclosure.

FIG. 10 illustrates a block diagram 1000 of a mesh point 110 according to embodiments of the present disclosure. The mesh point 110 comprises a processor 1010 and a memory 1020 coupled to the processor 1010. The memory 1020 stores instructions 1022, 1024, and 1026 to cause the processor 1010 to implement a method for managing the mesh point 110. In some embodiments of the present disclosure, the instructions 1022 cause the processor 1010 to transmit, from a mesh point to a mesh portal, a request indicating that Reduced Neighbor Report (RNR) information is required. The instructions 1024 cause the processor 1010 to receive, from the mesh portal, a beacon with the RNR information; and the instructions 1026 cause the processor 1010 to establish a mesh link with a target mesh portal based on the beacon with the RNR information.

In some embodiments of the present disclosure, the memory 1020 further stores instructions to cause the processor 1010 to: select the target mesh portal based on a state of the mesh portal that is included in the beacon and a state of at least one neighbor mesh portal of the mesh portal that is included in the RNR information; and establish the mesh link with the target mesh portal. In some embodiments of the present disclosure, the memory 1020 further stores instructions to cause the processor 1010 to: select a radio from the plurality of radios included in the target mesh portal; and establish the mesh link with the target mesh portal via the selected radio. In some embodiments of the present disclosure, the mesh portal and the at least one neighbor mesh portal include a plurality of radios associated with a plurality of mobile network generations, and the states of the mesh point and the at least one neighbor mesh portal include radio states of the plurality of radios, respectively.

In some embodiments of the present disclosure, the memory 1020 further stores instructions to cause the processor 1010 to: transmit, to the target mesh portal, a probe request indicating that the RNR information is not required in a further beacon from the mesh portal. In some embodiments of the present disclosure, the memory 1020 further stores instructions to cause the processor 1010 to: transmit, to the target mesh portal, a request indicating that Dynamic Host Configuration Protocol (DHCP) information is required in an Extensible Authentication Protocol over LAN (EAPoL) frame; receive, from the target mesh portal, an EAPoL frame with a DHCP offer; and transmit, to the target mesh portal, a further EAPoL frame with a DHCP confirmation. In some embodiments of the present disclosure, the EAPoL frame is encrypted with a pairwise transient key shared by the mesh point and the mesh portal, and the memory 1020 further stores instructions to cause the processor 1010 to: encrypt the further EAPoL frame with the pairwise transient key; and transmit the encrypted further EAPoL frame to the target mesh portal. In some embodiments of the present disclosure, the DHCP offer is received by the target mesh portal from any of: a DHCP server that is deployed at the target mesh portal; and a DHCP server that is deployed in a further network other than a mesh network that includes the mesh point and the mesh portal. In some embodiments of the present disclosure, at least one field in the beacon is replaced with a bitmap, the at least one field including information that is unimportant for establishing the mesh link.

With these embodiments, the mesh point 110 may trigger a complete new scanning procedure. Specifically, the RNR flag requires the mesh portal 120 to include RNR information into the beacon, such that the mesh point 110 may extract states of all the radios (including 2.4G, 5G and 6G) in the mesh portal 120 and the neighbor mesh portal from the beacon. Therefore, the mesh point 110 does not need to scan each and every channel of all the radios for the mesh portal 120 and the neighbor mesh portal, and thus the time cost and the data communication of the scanning procedure may be greatly reduced. Further, communications in the scanning procedure are lowered, such that conflicts in the air may be alleviated.

Figure 11:
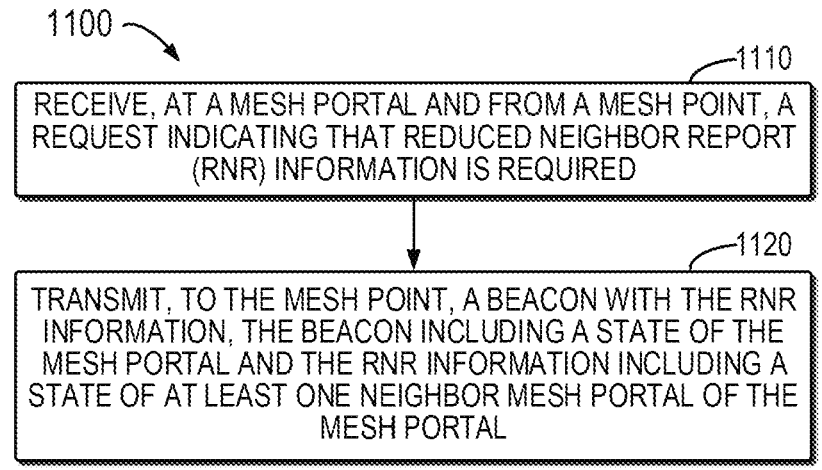
FIG. 11 illustrates a flowchart of an example method for managing a mesh portal according to embodiments of the present disclosure.

FIG. 11 illustrates a flowchart of an example method 1100 for managing a mesh portal 120 according to embodiments of the present disclosure. At a block 1110, a request is received from a mesh point at a mesh portal, and the request indicates that Reduced Neighbor Report (RNR) information is required. At a block 1120, a beacon with the RNR information is transmitted to the mesh point, the beacon includes a state of the mesh portal and the RNR information including a state of at least one neighbor mesh portal of the mesh portal. In some embodiments of the present disclosure, the mesh portal and the at least one neighbor mesh portal include a plurality of radios associated with a plurality of mobile network generations, and the states of the mesh point and the at least one neighbor mesh portal include radio states of the plurality of radios, respectively.

In some embodiments of the present disclosure, a probe request is received, from the mesh point, for establishing a mesh link with the mesh portal; and a probe response without the RNR information is transmitted to the mesh point. In some embodiments of the present disclosure, the probe request is for establishing the mesh link with a radio in the plurality of radios included in the mesh portal, and the radio is selected by the mesh point based on a radio state of the radio states for the mesh portal. In some embodiments of the present disclosure, the probe response is transmitted to the mesh point for confirming that a mesh link is established between the mesh point and the radio of the mesh portal via the radio. In some embodiments of the present disclosure, a timer is started for representing an expiration for transmitting at least one further beacon with the RNR information; and a beacon without the RNR information is transmitted to the mesh point in response to an expiration of the timer.

In some embodiments of the present disclosure, a request is received from the mesh point, and the request indicates that Dynamic Host Configuration Protocol (DHCP) information is required in an Extensible Authentication Protocol over LAN (EAPoL) frame. An EAPoL frame with a DHCP offer is transmitted to the mesh point, and a further EAPoL frame with a DHCP confirmation is received from the mesh point. In some embodiments of the present disclosure, the DHCP offer is from any of: a DHCP server that is deployed at the target mesh portal, and a DHCP server that is deployed in a further network other than a mesh network that includes the mesh point and the mesh portal. The DHCP offer is encoded into the EAPoL frame, and the EAPoL frame is encrypted with a pairwise transient key shared by the mesh point and the mesh portal. In some embodiments of the present disclosure, at least one field that includes information that is unimportant for establishing a mesh link is identified in the beacon, and the at least one field in the beacon is replaced with a bitmap.

With these embodiments, the method 1100 provides an effective solution for managing the mesh portal 120. Specifically, in response to a scanning request from the mesh point 110, the mesh portal 120 may combine states of all the radios (including 2.4G, 5G and 6G) in the mesh portal 120 and the neighbor mesh portal into the beacon. Therefore, the time cost and the data communication of the scanning procedure may be greatly reduced. Further, communications in the scanning procedure are lowered, such that conflicts in the air may be alleviated.

Figure 12:
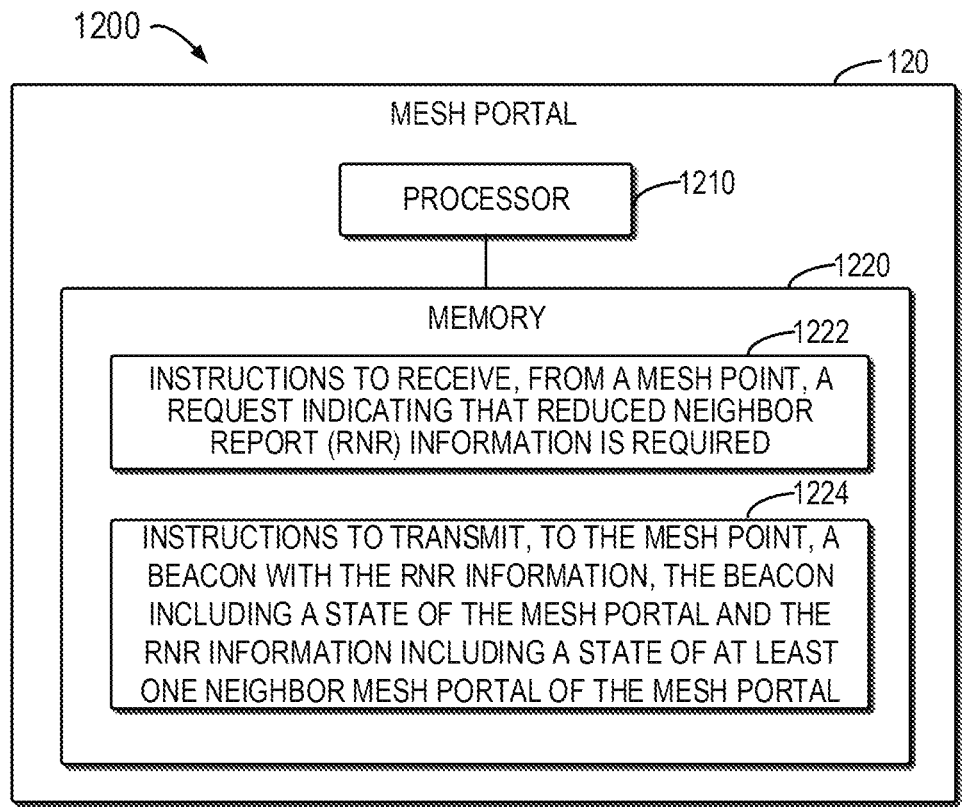
FIG. 12 illustrates a block diagram of a mesh portal according to embodiments of the present disclosure.

FIG. 12 illustrates a block diagram of a mesh portal according to embodiments of the present disclosure. The mesh point 120 comprises a processor 1210 and a memory 1220 coupled to the processor 1210. The memory 1220 stores instructions 1222 and 1224 to cause the processor 1210 to implement a method for managing the mesh point 120. In some embodiments of the present disclosure, the instructions 1222 cause the processor 1210 to receive, at a mesh portal and from a mesh point, a request indicating that Reduced Neighbor Report (RNR) information is required; and the instructions 1224 cause the processor 1210 to transmit, to the mesh point, a beacon with the RNR information, the beacon including a state of the mesh portal and the RNR information including a state of at least one neighbor mesh portal of the mesh portal.

In some embodiments of the present disclosure, the memory 1220 further stores instructions to cause the processor 1210 to: receive, from the mesh point, a probe request for establishing a mesh link with the mesh portal; and transmit, to the mesh point, a probe response without the RNR information. In some embodiments of the present disclosure, the mesh portal and the at least one neighbor mesh portal include a plurality of radios associated with a plurality of mobile network generations, and the states of the mesh point and the at least one neighbor mesh portal include radio states of the plurality of radios, respectively. In some embodiments of the present disclosure, the probe request is for establishing the mesh link with a radio in the plurality of radios included in the mesh portal, and the radio is selected by the mesh point based on a radio state of the radio states for the mesh portal. In some embodiments of the present disclosure, the memory 1220 further stores instructions to cause the processor 1210 to transmit, to the mesh point, the probe response for confirming that a mesh link is established between the mesh point and the radio of the mesh portal via the radio.

In some embodiments of the present disclosure, the memory 1220 further stores instructions to cause the processor 1210 to: start a timer for representing an expiration for transmitting at least one further beacon with the RNR information; and transmit, to the mesh point, a beacon without the RNR information in response to an expiration of the timer. In some embodiments of the present disclosure, the memory 1220 further stores instructions to cause the processor 1210 to: receive, from the mesh point, a request indicating that Dynamic Host Configuration Protocol (DHCP) information is required in an Extensible Authentication Protocol over LAN (EAPoL) frame; transmit, to the mesh point, an EAPoL frame with a DHCP offer; and receive, from the mesh point, a further EAPoL frame with a DHCP confirmation. In some embodiments of the present disclosure, the memory 1220 further stores instructions to cause the processor 1210 to: obtain the DHCP offer from any of: a DHCP server that is deployed at the target mesh portal, and a DHCP server that is deployed in a further network other than a mesh network that includes the mesh point and the mesh portal; encode the DHCP offer into the EAPoL frame; and encrypt the EAPoL frame with a pairwise transient key shared by the mesh point and the mesh portal. In some embodiments of the present disclosure, the memory 1220 further stores instructions to cause the processor 1210 to: identify at least one field in the beacon that includes information that is unimportant for establishing a mesh link; and replace the at least one field in the beacon with a bitmap.

With these embodiments, the mesh portal 120 may be triggered by the RNR flag in a request from the mesh point 110. Specifically, once the RNR flag is detected, the mesh portal 120 may combine states of all the radios (including 2.4G, 5G and 6G) in the mesh portal 120 and the neighbor mesh portal into the beacon. Therefore, the time cost and the data communication of the scanning procedure may be greatly reduced. Further, communications in the scanning procedure are lowered, such that conflicts in the air may be alleviated.

In some embodiments of the present disclosure, there is provided a mesh portal. The mesh portal comprises: a processor and a memory coupled to the processor, the memory storing instructions to cause the processor to: receiving, from a mesh point, a request indicating that Reduced Neighbor Report (RNR) information is required, the mesh portal and at least one neighbor mesh portal of the mesh portal include a plurality of radios associated with a plurality of mobile network generations, respectively; collect radio states of the plurality of radios included in the mesh portal and the at least one neighbor mesh portal; and transmit, to the mesh point, a beacon with the RNR information, the beacon including radio states of the plurality of radios included in the mesh portal, and the RNR information including radio states of the plurality of radios included in the at least one neighbor mesh portal.

In some embodiments of the present disclosure, the memory further stores instructions to cause the processor to: start a timer for representing an expiration for transmitting at least one further beacon with the RNR information; and transmit, to the mesh point, a beacon without the RNR information in response to the expiration of the timer. In some embodiments of the present disclosure, the memory further stores instructions to cause the processor to: receive, from the mesh point, a request indicating that Dynamic Host Configuration Protocol (DHCP) information is required in an Extensible Authentication Protocol over LAN (EAPoL) frame; transmit, to the mesh point, an EAPoL frame with a DHCP offer; and receive, from the mesh point, a further EAPoL frame with a DHCP confirmation. In some embodiments of the present disclosure, the memory further stores instructions to cause the processor to: identify at least one field in the beacon that includes information that is unimportant for establishing a mesh link; and replace the at least one field in the beacon with a bitmap.

With these embodiments, the mesh portal 120 may be triggered by the RNR flag in a request from the mesh point 110. Specifically, once the RNR flag is detected, the mesh portal 120 may combine states of all the radios (including 2.4G, 5G and 6G) in the mesh portal 120 and the neighbor mesh portal into the beacon. Here, the mesh portal may stop transmitting the RNR information based on a timer or a further request without the RNR flag. Further, DHCP information may be combined with the EAPoL frame and unimportant fields may be removed from the beacon. Accordingly, the time cost and the data communication of the scanning procedure may be greatly reduced. Further, communications in the scanning procedure are lowered, such that conflicts in the air may be alleviated.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single embodiment. Conversely, various features that are described in the context of a single embodiment may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
   transmitting, from a mesh point to a mesh portal, a request indicating that Reduced Neighbor Report (RNR) information is required;
   receiving, at the mesh point, from the mesh portal, and prior to expiration of a duration of time for transmitting at least one further beacon with the RNR information started by a mesh portal timer, a beacon with the RNR information;
   establishing a mesh link with a target mesh portal based on the beacon with the RNR information; and
   receiving, at the mesh point, from the mesh portal, and after expiration of the mesh portal timer, a beacon without the RNR information.

2. The method according to claim 1, wherein establish the mesh link with the target mesh portal comprises:
   selecting the target mesh portal based on a state of the mesh portal that is included in the beacon and a state of at least one neighbor mesh portal of the mesh portal that is included in the RNR information; and
   establishing the mesh link with the target mesh portal.

3. The method according to claim 2, wherein the mesh portal and the at least one neighbor mesh portal include a plurality of radios associated with a plurality of mobile network generations, the states of the mesh point and the at least one neighbor mesh portal include radio states of the plurality of radios, respectively; and establishing the mesh link with the target mesh portal comprises:
  selecting a radio from the plurality of radios included in the target mesh portal; and
  establishing the mesh link with the target mesh portal via the selected radio.

4. The method according to claim 1, further comprising: transmitting, to the target mesh portal, a probe request indicating that the RNR information is not required in a further beacon from the mesh portal.

5. The method according to claim 1, further comprising:
  transmitting, to the target mesh portal, a request indicating that Dynamic Host Configuration Protocol (DHCP) information is required in an Extensible Authentication Protocol over LAN (EAPoL) frame;
  receiving, from the target mesh portal, an EAPoL frame with a DHCP offer; and
  transmitting, to the target mesh portal, a further EAPoL frame with a DHCP confirmation.

6. The method according to claim 5, wherein the EAPoL frame is encrypted with a pairwise transient key shared by the mesh point and the mesh portal, and
  transmitting the further EAPOL frame with the DHCP confirmation comprises:
    encrypting the further EAPoL frame with the pairwise transient key; and
    transmitting, to the target mesh portal, the encrypted further EAPoL frame.

7. The method according to claim 5, wherein the DHCP offer is received by the target mesh portal from any of:
  a DHCP server that is deployed at the target mesh portal; and
  a DHCP server that is deployed in a further network other than a mesh network that includes the mesh point and the mesh portal.

8. The method according to claim 1, wherein at least one field in the beacon is replaced with a bitmap, the at least one field including information that is unimportant for establishing the mesh link.

9. A method, comprising:
  receiving, at a mesh portal and from a mesh point, a request indicating that Reduced Neighbor Report (RNR) information is required;
  starting a timer for representing an expiration for transmitting at least one further beacon with the RNR information;
  transmitting, to the mesh point, a beacon with the RNR information, the beacon including a state of the mesh portal and the RNR information including a state of at least one neighbor mesh portal of the mesh portal; and
  transmitting, to the mesh point, a beacon without the RNR information in response to an expiration of the timer.

10. The method according to claim 9, further comprising:
  receiving, from the mesh point, a probe request for establishing a mesh link with the mesh portal; and
  transmitting, to the mesh point, a probe response without the RNR information.

11. The method according to claim 10, wherein the mesh portal and the at least one neighbor mesh portal include a plurality of radios associated with a plurality of mobile network generations, the states of the mesh point and the at least one neighbor mesh portal include radio states of the plurality of radios, respectively.

12. The method according to claim 11, wherein the probe request is for establishing the mesh link with a radio in the plurality of radios included in the mesh portal, and the radio is selected by the mesh point based on a radio state of the radio states for the mesh portal; and
  transmitting the probe response comprises: transmitting, to the mesh point, the probe response for confirming that a mesh link is established between the mesh point and the radio of the mesh portal via the radio.

13. The method according to claim 9, further comprising:
  receiving, from the mesh point, a request indicating that Dynamic Host Configuration Protocol (DHCP) information is required in an Extensible Authentication Protocol over LAN (EAPOL) frame;
  transmitting, to the mesh point, an EAPoL frame with a DHCP offer; and
  receiving, from the mesh point, a further EAPOL frame with a DHCP confirmation.

14. The method according to claim 13, wherein transmitting the EAPoL frame with the DHCP offer comprises:
  obtaining the DHCP offer from any of: a DHCP server that is deployed at the target mesh portal, and a DHCP server that is deployed in a further network other than a mesh network that includes the mesh point and the mesh portal;
  encoding the DHCP offer into the EAPoL frame; and
  encrypting the EAPoL frame with a pairwise transient key shared by the mesh point and the mesh portal.

15. The method according to claim 9, wherein transmitting the beacon with the RNR information comprising:
  identifying at least one field in the beacon that includes information that is unimportant for establishing a mesh link; and
  replacing the at least one field in the beacon with a bitmap.

16. The method according to claim 9, further comprising:
  receiving, from the mesh point, a probe request for establishing a mesh link with a target mesh portal; and
  transmitting, to the mesh point, a probe response without the RNR information.

17. A mesh portal, comprising:
  a processor and a memory coupled to the processor, the memory storing instructions to cause the processor to:
    receive, from a mesh point, a request indicating that Reduced Neighbor Report (RNR) information is required, the mesh portal and at least one neighbor mesh portal of the mesh portal include a plurality of radios associated with a plurality of mobile network generations, respectively;
    start a timer for representing an expiration for transmitting at least one further beacon with the RNR information;
    collect radio states of the plurality of radios included in the mesh portal and the at least one neighbor mesh portal;
    transmit, to the mesh point, a beacon with the RNR information, the beacon including radio states of the plurality of radios included in the mesh portal, and the RNR information including radio states of the plurality of radios included in the at least one neighbor mesh portal; and
    transmit, to the mesh point, a beacon without the RNR information in response to the expiration of the timer.

18. The mesh portal according to claim 17, wherein the memory further stores instructions to cause the processor to:

receive, from the mesh point, a request indicating that Dynamic Host Configuration Protocol (DHCP) information is required in an Extensible Authentication Protocol over LAN (EAPOL) frame;

transmit, to the mesh point, an EAPoL frame with a DHCP offer; and receive, from the mesh point, a further EAPoL frame with a DHCP confirmation.

19. The mesh portal according to claim 17, wherein the memory further stores instructions to cause the processor to:

identify at least one field in the beacon that includes information that is unimportant for establishing a mesh link; and replace the at least one field in the beacon with a bitmap.

20. The mesh portal according to claim 17, wherein the memory further stores instructions to cause the processor to:

receive, from the mesh point, a probe request for establishing a mesh link with a target mesh portal; and transmit, to the mesh point, a probe response without the RNR information.

* * * * *